United States Patent [19]
Hauser et al.

[11] Patent Number: 5,748,905
[45] Date of Patent: May 5, 1998

[54] FRAME CLASSIFICATION USING CLASSIFICATION KEYS

[75] Inventors: Stephen A. Hauser, Burlington; Jeffrey L. Williams, Hopkinton, both of Mass.

[73] Assignees: Fujitsu Network Communications, Inc., Richardson, Tex.; Fujitsu Limited, Kawasaki, Japan

[21] Appl. No.: 701,335

[22] Filed: Aug. 30, 1996

[51] Int. Cl.$^6$ .................................................. G06F 13/00
[52] U.S. Cl. ....................................................... 395/200.79
[58] Field of Search ........................ 364/DIG. 1, DIG. 2; 395/200.3, 200.5, 200.53, 200.59, 200.66, 200.68, 200.76, 200.79, 200.8, 280, 285, 286

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |

(List continued on next page.)

FOREIGN PATENT DOCUMENTS 484943  3/1992  Japan .

OTHER PUBLICATIONS

An Ascom Timeplex White Paper, *Meeting Critical Requirements with Scalable Enterprise Networking Solutions Based on a Unified ATM Foundation*, pp. 1–12, Apr. 1994.

Douglas H. Hunt, ATM Traffic Management—Another Perspective, *Business Communications Review*, Jul. 1994.

Richard Bubenik et al., Leaf Initiated Join Extensions, *Technical Committee, Signalling Subworking Group, ATM Forum/94–0325R1*, Jul. 1, 1994.

Douglas H. Hunt et al., Flow Controlled Virtual Connections Proposal for ATM Traffic Management (Revision R2), *Traffic Management Subworking Group, ATM_Forum/94–0632R2*, Aug. 1994.

Flavio Bonomi et al., The Rate–Based Flow Control Framework for the Available Bit Rate ATM Service, *IEEE Network*, Mar./Apr. 1995, pp. 25–39.

(List continued on next page.)

Primary Examiner—Robert B. Harrell
Attorney, Agent, or Firm—Weingarten, Schurgin, Gagnebin & Hayes LLP

[57] ABSTRACT

An improved method and apparatus for recognizing, classifying and processing frames received at a frame processor in a computer network is disclosed. Following receipt of a frame at an input port of a frame processor, source and destination addresses are parsed from the frame. A plurality of lookup tables are provided in a memory, each of which contains a search field and a classification key field. Source or destination addresses are stored in the respective search fields along with other information associated with the frame and a compact classification key is stored in the corresponding classification key field. Searches are performed of the respective search fields within the respective lookup tables to determine whether a match exists between the each of the destination and source addresses and other information and the search field within the lookup tables. In the event the searches yield a match, a classification key associated with each respective address is retrieved. Classification keys corresponding to addresses thus retrieved are concatenated and the concatenated value is employed as the basis for a further search of the search field of another one of the lookup tables to identify a classification key which is employed to specify the manner of further processing of the received frame.

50 Claims, 8 Drawing Sheets

U.S. PATENT DOCUMENTS

| | | | |
|---|---|---|---|
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 37370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander May et al. | 375/1 |
| 5,093,912 | 3/1992 | Dong et al. | 395/650 |
| 5,115,429 | 5/1992 | Hluchyj | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,397 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |

| | | | |
|---|---|---|---|
| 5,440,547 | 8/1995 | Easki et al. | 370/60 |
| 5,444,702 | 8/1995 | Burnett et al. | 370/60.1 |
| 5,446,733 | 8/1995 | Tsuroka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,465,331 | 11/1995 | Yang et al. | 395/200 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |

OTHER PUBLICATIONS

R. Jain, Myths About Congestion Management in High Speed Networks, *Internetworking Research and Experience*, vol. 3, 101–113 (1992).

Douglas H. Hunt et al., Credit–Based FCVC Proposal for ATM Traffic Management (Revision R1), *ATM Forum Technical Committee Traffic Management Subworking Group*, ATM_Forum/94–0168R1, Apr. 28, 1994.

Douglas H. Hunt et al., Action Item Status for Credit–Based FCVC Proposal, *ATM Forum Technical Committee Traffic Management Subworking Group*, ATM_Forum/94–0439, Apr. 28, 1994.

Timothy P. Donahue et al., Arguments in Favor of Continuing Phase 1 as the Initial ATM Forum P–NNI Routing Protocol Implementation, *ATM Forum Technical Committee*, ATM Forum/94–0460, Apr. 28, 1994.

Richard Bubenick et al., Leaf Initiated Join Extensions, *Technical Committee, Signalling Subworking Group, ATM Forum*/94–0325, Apr. 28, 1994.

Rob Coltun et al., PRP: A P–NNI Routing Protocol Proposal, *ATM Forum Technical Committee*, ATM_Forum/94–0492, Apr. 28, 1994.

Richard Bubenik et al., Leaf Initiated Join Extensions, *ATM Forum Technical Committee, Signalling Subworking Group, ATM Forum* 94–0325, Apr. 28, 1994.

Richard Bubenik et al., Requirements For Phase 2 Signaling Protocol, *ATM Forum Technical Committee, Signalling Subworking Group, ATM Forum* 94–1078, Jan. 1, 1994.

H.T. Kung and K. Chang, Receiver–Oriented Adaptive Buffer Allocation in Credit–Based Flow Control for ATM Networks, *Proceedings of INFOCOM '95*, Apr. 2–6, pp. 1–14.

H.T. Kung et al., Credit–Based Flow Control for ATM Networks: Credit Update Protocol, Adaptive Credit Allocation, and Statistical Multiplexing, *Proceedings of ACM SIGCOMM '94 Symposium on Communications Architectures, Protocols and Applications*, Aug. 31–Sep. 2, 1994, pp. 1–14.

SITA, ATM RFP: C–Overall Technical Requirements, Sep. 1994.

Hosein F. Badran et al., Head of Line Arbitration in ATM Switches with Input–Output Buffering and Backpressure Control, *Globecom*, pp. 347–351, 1991.

Head of Line Arbitration in ATM Switches with Input–Output Buffering and Backpressure Control. By Hosein F. Badran and H. T. Mouftah, *Globecom* '91, pp. 0347–0351.

| Address Field | DLDID | TYPE | VAL | S1 | Segment | S2 | Key |
|---|---|---|---|---|---|---|---|
| $MDA_1$ | 00001 | 001 | 1 | | 00000 | | $MDKey_1$ |
| $MDA_2$ | 00001 | 001 | 1 | | 00001 | | $MDKey_2$ |
| $MDA_3$ | 00001 | 001 | 1 | | 00010 | | $MDKey_3$ |
| | | | | | | | |
| $MSA_1$ | 00001 | 010 | 1 | | 00001 | | $MSKey_1$ |
| $MSA_2$ | 00001 | 010 | 1 | | 00010 | | $MSKey_2$ |
| $MSA_3$ | 00001 | 010 | 1 | | 00100 | | $MSKey_3$ |
| | | | | | | | |
| $NDA_1$ | 00000 | 011 | 1 | | 00001 | | $NDKey_1$ |
| $NDA_2$ | 00000 | 011 | 1 | | 00001 | | $NDKey_2$ |
| $NDA_3$ | 00000 | 011 | 1 | | 00001 | | $NDKey_3$ |
| | | | | | | | |
| $NSA_1$ | 00000 | 100 | 1 | | 00001 | | $NSKey_1$ |
| $NSA_2$ | 00000 | 100 | 1 | | 00001 | | $NSKey_2$ |
| $NSA_3$ | 00000 | 100 | 1 | | 00001 | | $NSKey_3$ |
| | | | | | | | |
| $MDKey_1$ \| $MSKey_2$ | 00000 | 101 | 1 | | 00001 | | $Midget_1$ |
| $MDKey_2$ \| $MSKey_3$ | 00000 | 101 | 1 | | 00001 | | $Midget_2$ |
| | | | | | | | |
| $NDKey_1$ \| $NSKey_2$ | 00000 | 110 | 1 | | 00001 | | $Nidget_1$ |
| $NDKey_1$ \| $NSKey_3$ | 00000 | 110 | 1 | | 00001 | | $Nidget_2$ |

FIG. 7

| Destination MAC Address | | ← Input | Output → | | |
|---|---|---|---|---|---|
| TYPE | MAC Address | DLD ID | OUR | SEG # | M D KEY |
| Source MAC Address | | | | | |
| TYPE | MAC Address | DLD ID | OUR | SEG # | M S KEY |
| Midget Generator | | | | | |
| TYPE | M D KEY | M S KEY | 0 | 0 | Super | X | MIDGET |
| Destination Network Layer Address | | | | | |
| TYPE | NL Address | 0 | X | X | N D KEY |
| Source Network Layer Address | | | | | |
| TYPE | NL Address | 0 | X | X | N S KEY |
| Nidget Generator | | | | | |
| TYPE | N D KEY | N S KEY | FEP/XPT | 0 | X | X | NIDGET |

SEARCH ENGINE Input Format

| SOT | SOT.IN.SOF |
|---|---|
| NIDGET | DATA |
| MIDGET | DATA |
| MAC SOURCE KEY | DATA |
| ALE | DATA |
| HEADER | DATA |
|  | DATA |
|  | DATA |
|  | DATA |
|  | DATA |
|  | DATA.EOT |

| SOT | SOT.IN |
|---|---|
| MID-FRAME or END OF FRAME | XXX |
|  | XXX |
|  | XXX |
|  | XXX |
|  | XXX.EOT |

*FIG. 10A*

SEARCH ENGINE Output Format

| SOT | SOT.IN.SOF |
|---|---|
| VID | DATA |
| NIDGET | DATA |
| MIDGET | DATA |
| MAC SOURCE KEY | DATA |
| ALE | DATA |
| HEADER | DATA |
|  | DATA |
|  | DATA |
|  | DATA |
|  | DATA |
|  | DATA.EOT |

| SOT | SOT.IN |
|---|---|
| MID-FRAME or END OF FRAME | XXX |
|  | XXX |
|  | XXX |
|  | XXX |
|  | XXX.EOT |

*FIG. 10B*

FRAME CLASSIFICATION USING CLASSIFICATION KEYS

FIELD OF THE INVENTION

The present invention relates to networking products and techniques and more specifically, to apparatus and methods for high speed frame recognition, classification and processing.

BACKGROUND OF THE INVENTION

Over the past decade with the increase in the use of computers in the corporate environment, there has been a rapid increase in the utilization of networks to facilitate communication and transmittal of information between computers connected to such networks. Initially, most of the networks were stand-alone networks and each network operated in accordance with a particular specification or standard. Some of the most common data link layer standards include the IEEE 802.3 standard, the Ethernet version 2 standard, the IEEE 802.5 token ring standard and the Fiber Distributed Data Interface (FDDI) standard and more recently the Asynchronous Transfer Mode (ATM) standard. Some of the common Network Layer standards include TCP/IP, DECNET, IPX and Appletalk. No two of the standards within the same protocol level employ the same frame format and the protocols implemented in many of the standards operate at differing speeds.

In the last several years there has been an increasing need to interconnect the disparate networks to facilitate communication and information transfer among such networks. This function is performed by frame processors which serve, among other functions, to recognize and translate frames received from one network in one frame format for use in another network having another frame format.

Frame processors typically have a number of input and output ports for receipt and transmission of frames. Such processors must therefore be able to recognize the incoming frame format, categorize and translate the frame if the frame is to be transmitted over a network possessing a different frame format from that of the received frame, and identify the forwarding path including the physical output port to be employed. It is desirable to process and translate received frames rapidly so as to minimize latency in the frame processor.

Frame processors have historically performed the above described process in software. This approach requires that the frame first be stored in memory and adds undesirable delay to the frame conversion process. Additionally, frame recognition and translation via software driven processors, does not permit frames to be processed at the frame reception rates. Accordingly, substantial buffering must be provided and/or frames discarded during high traffic bursts.

While some fast processors exist, they tend to employ techniques which require substantial memory resources resulting in a product which is expensive and which remains subject to overload at high frame rates.

It would therefore be desirable to have a frame processor which would be capable of recognizing, categorizing and translating frames at frame reception rates while minimizing the hardware resources necessary to implement such functions and the likelihood of overload at high frame rates.

SUMMARY OF THE INVENTION

In accordance with the present invention an improved method and apparatus for recognizing, characterizing and processing frames received from a plurality of computer networks is disclosed. A received frame having an identifiable frame format is received at one of a plurality of ports of a Local Area Network (LAN) interface. The received frame, which includes Media Access Control (MAC) source and destination addresses, is forwarded to a Mapping Engine state machine after segmenting the frame into a plurality of framelets, the first of which includes frame header information. The Mapping Engine state machine comprises two state machines; namely a Parsing Engine state machine and a Binary Compare Engine state machine. The Parsing Engine state machine extracts the MAC source and destination addresses from the initial framelet which contains the frame header information and stores the respective addresses in first and second Binary Compare Registers along with other frame identifying information.

A plurality of lookup tables is set up and maintained in a high speed static memory by system software. The lookup tables may comprise an addressable random access memory, a content addressable memory (CAM), or any other suitable memory which may be used for storing information and searching the stored information. The lookup tables include a search field and a key field. The search field, for example, for MAC layer addresses, is comprised of three fields, namely, an address field, a DLDID field and an ordered list Selection (Type) field. MAC source and destination addresses are stored in the address field. The DLDID field is loaded with a Data Link Domain identifier which serves to associate as a virtual lan, various workstations which may reside on different physical ports of the frame processor. The ordered list Selection (Type) field is loaded with a value which selects one of the plurality of lookup tables each of which comprises an ordered list. For example, the MAC Source Addresses, the MAC Destination Addresses, the Network Layer Source Addresses, concatenated MAC Destination and Source compact keys (MD Key and MS Key respectively) and the concatenated Network Destination and Source compact keys (ND and NS Key respectively) are each contained within separate ordered lists uniquely identified by the value within the ordered list selection field. A classification key associated with each entry in the ordered lists is stored in the key field.

Following extraction of the MAC source and destination addresses by the parsing engine state machine and the storing of such addresses within the respective binary compare registers, binary searches of appropriate ordered lists are initiated under the control of the Binary Compare Engine state machine to locate values within the search field which match the values within the Binary Compare Registers. In the event exact matches are identified as a result of the binary search, first and second MAC compact classification keys, identified as the MAC Destination Key (MD Key) and the MAC Source Key (MS Key) associated with the respective MAC destination and source addresses are retrieved. The MAC Destination and Source Keys identified as a result of the search are extracted from the respective ordered lists and stored in first and second processor registers.

In a similar manner, Network Layer source and destination addresses are parsed from the received frame, stored in the respective first and second Binary Compare Registers and a binary search of the respective ordered lists is performed under the control of the Binary Compare Engine state machine to locate entries within the respective search fields which match the data in the respective binary compare registers. In the event matches are identified, first and second Network Layer compact classification keys, identified as the Network Destination Key (ND Key) and the Network Source Key (NS Key) associated with the respective Network Layer destination and source addresses are retrieved and are stored in specified processor registers.

The MD Key and MS Key are then concatenated to form a first search value which is stored within one of the Binary Compare Registers and the ND Key and NS Key may be concatenated with an FEP/XPT value which identifies the transport layer to form a second search value which is stored in the other of the Binary Compare Registers. The search field of the respective ordered list is next searched using the Binary Compare Engine state machine in an effort to locate entries within the lookup tables which present exact matches of the first and second search values contained in the first and second Binary Compare Registers, once again searching the appropriate ordered lists identified by the ordered list Selection (Type) field. In the event exact matches are identified, a MAC address classification key (referred to as a Midget) and a Network Layer address classification key, (referred to as a Nidget) are extracted from the associated key field of the respective lookup tables and are stored in specified processor registers.

The Network Layer compact classification key (the Nidget) and the MAC Layer compact classification key (the Midget) are encapsulated within the initial framelet for the respective frame. The framelet including the encapsulated compact classification keys is next forwarded to subsequent stages such as a Search Engine state machine, a Modification Engine state machine, and a Statistics Engine state machine for further classification, modification and/or processing. More specifically, the Search Engine state machine resolves the Nidget and the Midget into a Vector ID which is subsequently employed by the Modification Engine state machine to decide what processing routine to apply to the respective frame.

The processing time for each state machine to perform its prescribed function is no greater than the frame reception time. Thus, the frame processor can process incoming frames at frame reception rates without the performance penalties associated with a software implementation or the cost or performance penalties associated with frame processors which store the received frame in memory prior to parsing and processing of the frame.

BRIEF DESCRIPTION OF THE DRAWINGS

The invention will be more fully understood by reference to the detailed description of the invention and the accompanying drawing of which:

FIG. 7 illustrates the organization of the lookup tables which are stored in the Pattern Memory of FIG. 1;

FIG. 10a illustrates the input format for frames entering the Search Engine state machine;

FIG. 10b illustrates the output format for frames exiting the Search Engine state machine;

DETAILED DESCRIPTION OF THE INVENTION

In accordance with the present invention a method and apparatus for recognizing, categorizing and processing frames received over one or more local area networks at a rate approximating or equal to the frame reception rate is disclosed. The ability to recognize and categorize received frames at high frame rates is achieved through the use of a novel technique for frame recognition and categorization.

Figure 1:
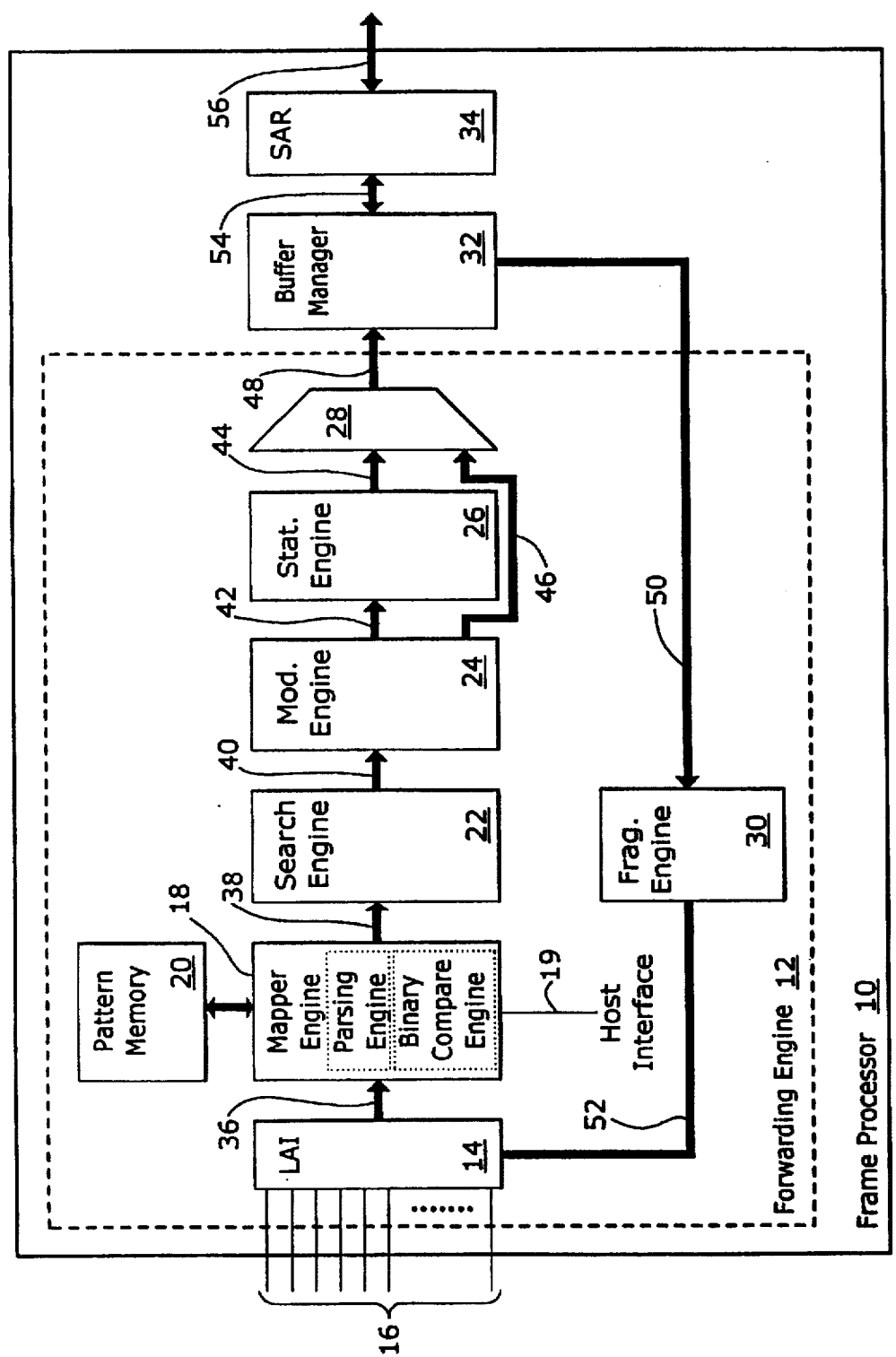
FIG. 1 is a block diagram of a frame processor in accordance with the present invention.

Referring to FIG. 1, a frame processor 10 which permits the implementation of various bridging and routing protocols includes a forwarding engine state machine 12 which includes a LAN Adaptation Interface (LAI) 14 having a plurality of Input/Output ports 16, a Mapper Engine state machine 18, a pattern memory 20, a Search Engine state machine 22, a Modification Engine state machine 24, a Statistics Engine state machine 26, a multiplexer 28 and a fragmentation engine state machine 30. The frame processor further includes a Buffer Manager state machine 32 and a Segmentation and Reassembly (SAR) state machine 34.

The output of the LAI 14 is coupled to the input of the Mapper Engine state machine 18 via a bus 36 such as a bus operative in accordance with the Interchip Bus protocol. Similarly, the Mapper Engine state machine 18 is coupled to the Search Engine state machine 22 via a bus 38, the Search Engine state machine 22 is coupled to the Modification Engine state machine (Mod. Engine) 24 via a bus 40, the Modification Engine state machine 24 is coupled to the Statistics Engine (Stat. Engine) state machine 24 via a bus 42 and the Statistics Engine state machine 26 is coupled to the input of a multiplexer 26 via bus 44. Additionally, the Modification Engine is coupled to the multiplexer 28 via bus 46. The buses 38, 40, 42, 44, and 46 are all operative in accordance with the Interchip Bus protocol although it should be appreciated that any suitable high speed bus may be employed. In a preferred embodiment the buses are 21 bits wide and include 16 data lines, 4 cycled definition lines and 1 halt line. The Interchip Bus permits a unidirectional flow of data from each engine within the frame processor to the connected engine or engines via a single and consistent interface mechanism.

The output of the multiplexer 28 is coupled to a Buffer Manager state machine 32 via a bus 48 and the output of the Buffer Manager state machine 32 is coupled to the input of the fragmentation engine (Frag. Engine) state machine 30 via bus 50. Additionally, the output of the fragmentation engine 30 is coupled to the input of the LAN Adaptation Interface 14 via a bus 52. Finally, the Buffer Manager may transmit or receive frames over a bus 54 to or from the Segmentation and Reassembly (SAR) state machine 34 for communication with an Asynchronous Transfer Mode (ATM) switch (not shown) over an ATM link 56. The Segmentation and Reassembly state machine segments frames into cells as required in accordance with the ATM protocol prior to transmittal or alternatively, reassembles cells received over the ATM link into frames.

Figure 2A:
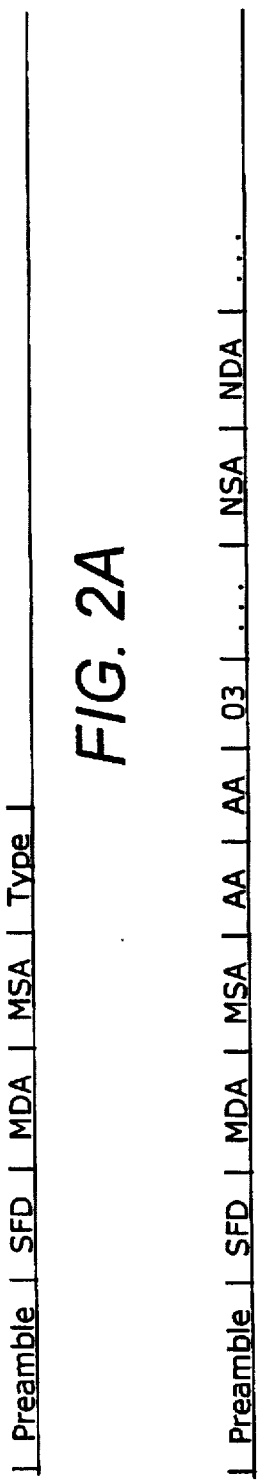
FIG. 2a is a diagram illustrating the Ethernet version 2 frame format.
Figure 2B:
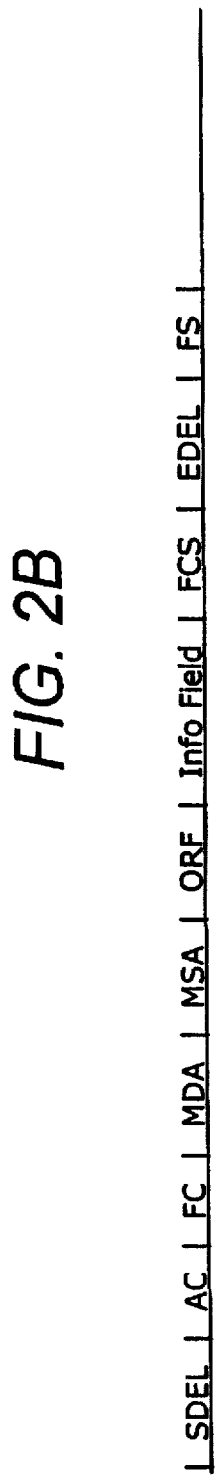
FIG. 2b is a diagram illustrating the IEEE 802.3 frame format.
Figure 2C:
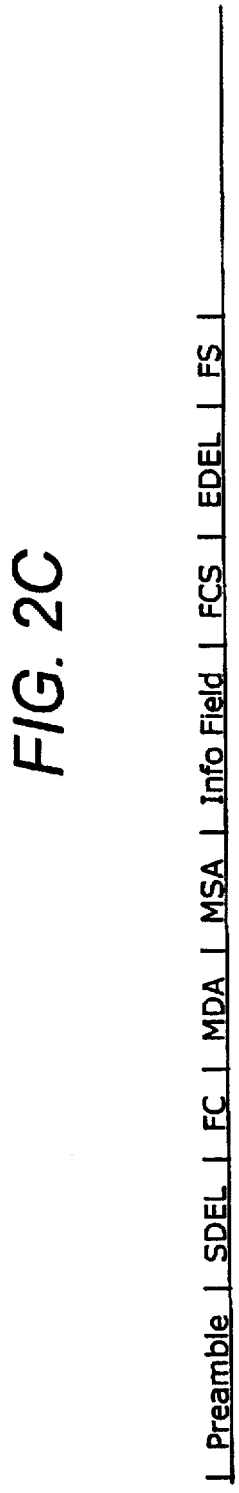
FIG. 2c is a diagram illustrating the IEEE 802.5 token ring frame format.
Figure 2D:
FIG. 2d is a diagram illustrating the fiber distributed data interface frame format.

The input/output ports 16 of the LAN Adaptation Interface 14 provide connections to various local area networks such as networks complying with the Ethernet version 2 protocol, the IEEE 802.3 protocol, the IEEE 802.5 Token Ring protocol, the fiber distributed data interface (FDDI) protocol or any other suitable network protocol. The LAN Adaptation Interface, performs the function of providing a physical interface to the various attached local area networks and additionally provides bandwidth normalization to adapt the frame reception rates of the various ports 16 to the processing rates within the forwarding engine 12 of the frame processor 10. More specifically, referring to FIGS. 2a–2d, each port 16 provides an interface to a specific local area network which in the preferred embodiment may be compliant with the frame format for Ethernet version 2 as depicted in FIG. 2a, the IEEE 802.3 protocol frame format as indicated in FIG. 2b, the IEEE 802.5 frame format is illustrated in FIG. 2c or the FDDI frame format as indicated in FIG. 2d. The network protocols associated with all of the ports 16 may be the same for simplicity, or alternatively, may be configured for compliance with different network protocols.

Received frames are conveyed from the LAI 14 to the Mapper Engine 18 employing an adaptation layer encapsulation (ALE) technique. More specifically, referring to FIGS. 3a and 3b, the LAI 14 receives a frame 58 having a header 60, a data portion 62 and a Frame Status Word (FSW) 64 marking the end of the frame. The LAI 14 segments the received frame into framelets 66, 68 and 70 which may be separately transmitted over the Interchip Bus 36 to the Mapper Engine 18.

Figures 3A, 3B:
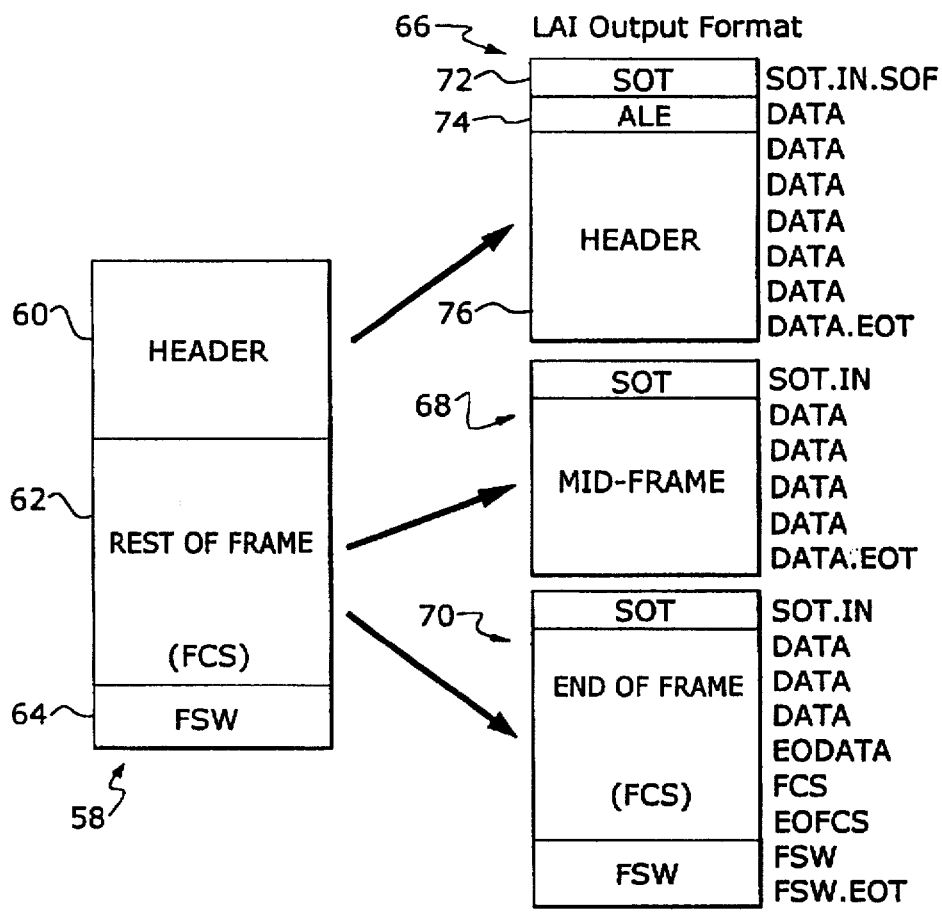
FIG. 3a is a representation of the format of a frame as received at the input to the frame processor.
FIG. 3b is a representation illustrating the frame format as transmitted by the LAN Adaption Interface to the Mapper Engine state machine.

As illustrated in FIG. 3b, the first framelet 66 comprises a Start of Transfer (SOT) field 72, an Adaptation Layer Encapsulation (ALE) field 74 and header data 76 which corresponds to the header data 60 in the received frame 58. An End of Transfer (EOT) delineator marks the end of the initial framelet 66. The received frame is further segmented into additional framelets as reflected by framelets 68 and 70. Each additional framelet commences with an SOT field and ends with a EOT delineator. In the presently disclosed embodiment, framelets may have a length up to 128 bytes although any suitable fixed predetermined framelet length may be employed.

Figure 4:
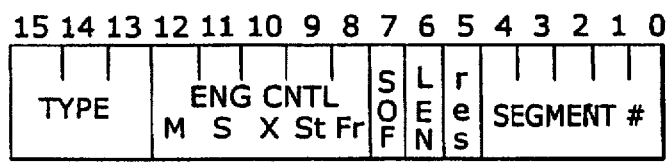
FIG. 4 illustrates the bit format within the Start of Transfer (SOT) field.

Referring to FIG. 4, the SOT field comprises a 16 bit word which includes Segment # bits (bits 0–4), a Length bit (bit 5), a Start of Frame (SOF) bit (bit 7), Engine Control bits (bits 8–12) and Type bits (bits 13–15). The Segment # bits identify the port 16 of the LAI 14 over which the frame was received. The Length bit within the SOT field is used to identify whether the last word in the framelet is two bytes in length (bit=0) or one byte in length (bit=1). The SOF bit serves to indicate that the present framelet begins a new frame. The Engine Control bits permit the specific engines to be separately enabled or disabled. More specifically, the M bit (bit 12) is the Mapper Engine enable/disable bit, the S bit (bit 11) is the Search Engine enable/disable bit, the X bit (bit 10) is the Modification Engine enable/disable bit, the ST bit (bit 9) is the Statistics Engine enable/disable bit and the FR bit (bit 8) is the Fragmentation Engine enable/disable bit. The ability to separately enable and disable the respective engines within the frame processor 10 permits a frame to be presented to the Mapper Engine 18 through the Host Interface 19 (shown in FIG. 1) from a microprocessor (not shown), which, for example, is ready for processing by the Modification Engine 22 and to allow the Mapper and Search Engines state machines 18 and 20 to skip processing of the frame. The Type and Segment # fields within the SOF field describe the source of the framelet, thereby permitting multiple frames to utilize the Interchip Buses on a time shared basis.

Figure 5:
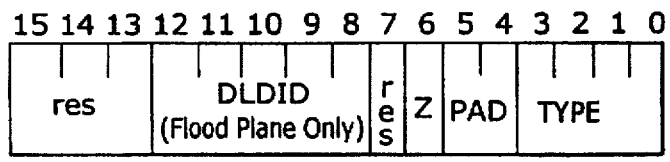
FIG. 5 illustrates the bit format within the Adaptation Layer Encapsulation (ALE) field.

As indicated in FIG. 3b, the second word in the initial framelet 66 for a frame that is output from the LAN Adaptation Interface comprises the ALE field 74. The format for the ALE field 74 is illustrated in FIG. 5. The ALE field 74 includes Type bits (bits 0–3) which are used to identify a parsing algorithm to be employed in the Mapper Engine 18. More specifically, the LAI identifies the received frame as arriving over a network having a particular network protocol and the Type bits are set to permit the Mapping Engine to select a parsing algorithm which is appropriate for the respective network protocol. Additionally, the ALE field contains Pad bits (bits 4–5) which identify the number of words of pad before the actual Media Access Control (MAC) Protocol Data Unit (PDU), and a Z bit (bit 6) which is used to indicate whether the received frame is in "standard" or "swizzled" format as hereinafter discussed.

The ALE field further contains Data Link Domain Identification bits (DLDID) (bits 8–12) which permit workstations associated with certain ports 16 to be identified as having a common DLDID. Workstations having a common DLDID may thus be associated as a virtual lan.

Structure of the Mapper Engine State Machine

Figure 6:
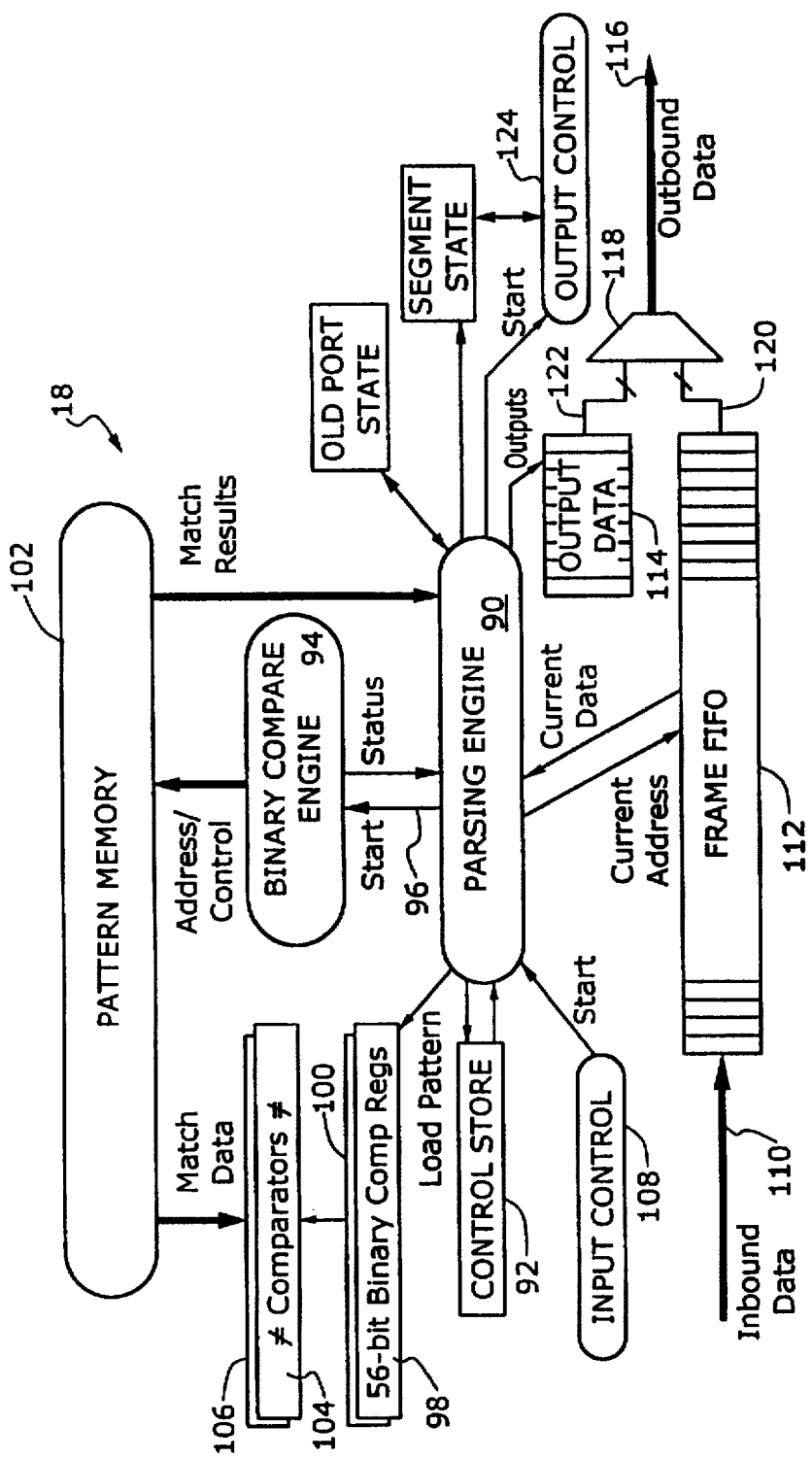
FIG. 6 is a block diagram of the Mapper Engine state machine employed in the frame processor of FIG. 1.

The Mapper Engine state machine 18 of FIG. 1 is illustrated in greater detail in FIG. 6. The Mapper Engine 18 receives framelets, such as framelets 66, 68 and 70 over the bus 36 and parses the received framelet to ascertain the Media Access Control (MAC) and network layer source and destination addresses. Referring to FIG. 6, the Parsing Engine state machine 90, which operates under the control of a Microprogrammable Control Store 92, is operative to perform this function. Additionally, the Mapper Engine includes a Binary Compare Engine state machine 94 which commences operation upon receipt of a start signal 96 from the Parsing Engine 90. The Mapper Engine 18 further includes first and second fifty-six bit Binary Compare Registers 98 and 100 respectively which are used to hold specified search patterns. The Binary Compare Registers 98 and 100 are loaded by the Parsing Engine 90 prior to initiating the operation of the binary compare engine 94. The Binary Compare Engine 94 is used in conjunction with a Pattern Memory 102 which contains a plurality of lookup tables in the form of ordered lists which are hereinafter described in greater detail. The Mapper Engine state machine 18 also includes first and second comparators 104 and 106 respectively which are employed in conjunction the Binary Compare Engine 94 to ascertain whether data in the first and second Binary Compare Registers 98 and 100 matches entries within the respective lookup tables stored in the Pattern Memory 102. The operation of the Parsing Engine 90 commences when Input Control Circuitry 108 recognizes the arrival of an SOT field over the Interchip Bus 110 from the LAI 14. The incoming framelet data is stored in a frame FIFO 112 and the initial framelet of a frame is parsed as discussed above to extract from the framelet the MAC source and destination addresses and the network source destination addresses contained within the framelet. The Mapper Engine 18 also includes an Output Data Buffer 114 which is used to store data to be inserted into the initial framelet of a frame prior to the forwarding of the framelets from the output of the Mapper Engine state machine 18 over bus 116 to the Search Engine state machine. Merging of the received framelet data with the data stored in the Output Data Buffer 114 is accomplished via the use of a Multiplexer 118 which receives framelet data over Signal Lines 120 and output data over Signal Lines 122. The merging of the output data with the framelet data prior to transmission by the Mapper Engine over the Mapper Output Interchip Bus 16 is controlled by Output Control Circuitry 124 upon activation by the Parsing Engine state machine 90.

Lookup Table Organization

An example of the lookup table 130 organization within the pattern memory 102 is depicted in FIG. 7. The data included within the table is purely exemplary data for purposes of discussion. The lookup tables, in a preferred embodiment, comprise ordered lists which include a forty-eight bit (6 byte) Address Field 132, a five bit Data Link Domain Identification Field (DLDID) 134, a three bit Selection (Type) Field 136, a one bit Valid Field 138, two single bit Status Fields S1 140 and S2 142, a five bit Segment Field 144 and a sixteen bit (two byte) Key Field 146. For MAC addresses, the Address Field 132, DLDID Field 134 and Selection (Type) Field 136 in combination form a fifty-six bit Search Field 148. It should be appreciated that the search field may contain any desired information to be searched.

The lookup tables may be considered as a single table comprising a plurality of ordered lists which are selectable, for example by the Type field (see FIGS. 7 and 8), or alternatively, as a plurality of individual tables which are co-resident in the pattern memory, with the particular table being selected, for example, by the Type field.

As a software maintenance function, the lookup tables 130 are initially set up and are modified during the operation of the frame processor to reflect valid connection information. The Address Field of the respective ordered lists contain MAC source addresses, MAC destination addresses, network source addresses, network destination addresses, a first group of concatenated classification keys, a second group of concatenated classification keys and optionally additional groups of classification keys. As an example, a given MAC source address is stored in the Address field 132, the associated DLDID in 134 and the Selection (Type) Field 136 is loaded with a unique identifier which specifies the particular ordered list within one of the lookup tables 130. Thus, in the present embodiment, the three bit Selection (Type) Field allows up to eight ordered lists may be maintained. The Segment Field 144 is loaded with the segment number corresponding to the physical port over which the frame was received (0-15) or alternatively, a virtual port identification (16-31). The Status Bits S1 140 and S2 142 may be used as an indicator to the parsing engine. More specifically, the Status Bits contain information relevant to the particular frame format being processed. The Binary Compare Engine presents the state of the status bits to the parsing engine upon completion of a successful match operation and the Parsing Engine uses the state information in a manner appropriate to the frame format being processed. A two-byte classification key is stored in the Key Field 146, each being associated with one of the entries in the Search Field 148 of the respective ordered list.

Operation of the Mapper Engine State Machine

The Mapper Engine state machine 18 classifies pairs of addresses, such as MAC source and destination addresses and Network Layer source and destination addresses, to generate particular compact classification keys which may be used by subsequent engines within the frame processor for the processing of the frame in the manner hereinafter described.

Figures 8, 9A, 9B:
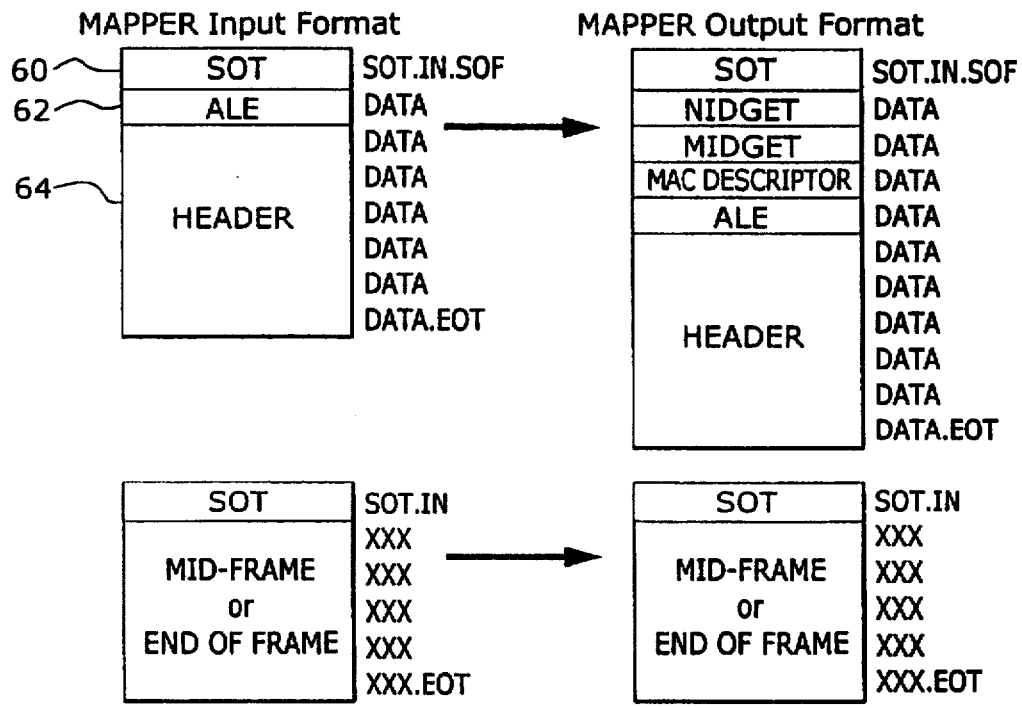
FIG. 8 illustrates the input and output data associated with frame classification by the Mapping Engine state machine for MAC and Network Layer address classification.
FIG. 9a illustrates the input format for frames entering the Mapper Engine state machine.
FIG. 9b illustrates the output format for frames exiting the Mapper Engine state machine.

Referring to FIGS. 7 and 8, after parsing the initial framelet of a frame to identify the MAC source and destination addresses, the parsing engine causes the respective 48 bit addresses to be stored in the first and second Binary Compare Registers 98 and 100. These addresses are concatenated with the associated DLDID for the frame and a value identifying a specific ordered list to be searched within the lookup tables 130. While in the present embodiment, the MAC source and destination addresses are forty-eight bits (6 bytes) wide, the DLDID information is five bits wide and the ordered list Selection (Type) Field is three bits wide, it is recognized that the width of the respective fields is a matter of design choice. The concatenation of a MAC address, the DLDID information and the ordered list selection information forms a fifty-six bit value which is stored in the respective Binary Compare Registers 98 and 100.

Upon activation by the Parsing Engine 90, the Binary Compare Engine 94 causes a binary search of the appropriate ordered lists within the lookup tables 130 to be conducted to ascertain whether exact matches for the data contained in the Binary Compare Registers 98 and 100 are to be found within the respective ordered lists of the lookup table 130. Each binary search is performed of the appropriate ordered list by initially accessing an entry approximately at the middle of the first field of the respective ordered list and testing the entry in the ordered list to see if such entry matches, is greater than or less than the value of the data in the respective Binary Compare Register. If a match is detected, the binary search is complete and an indication of the match is provided to the Binary Compare Engine. If the data value being searched is greater than the accessed entry in the ordered list, the relevant portion of the ordered list comprising the lower ordered list values is again divided, the middle entry of such portion accessed, and the respective value being searched is again compared to the value retrieved from the respective lookup table. The above process is reiterated until a match is detected or until it is determined that no corresponding entry is present within the respective lookup table. Alternatively, if the search value is less than the initial accessed entry from the ordered list, the relevant portion of the ordered list comprising the upper ordered list portion is again divided, the middle entry of such portion accessed and the respective search value is compared to the value retrieved from the lookup table. This process is likewise repeated until it is determined that a match exists or that there is no entry within the respective lookup table to the value being searched. To improve bandwidth utilization during the search process within the Binary Compare Engine, the comparison of a search value to a retrieved value is performed concurrently with a lookup of a second search value.

If a search of the Search Field 148 of the specified ordered list produces a match with the data in the Binary Compare Register 98 which contains a MAC source address, associated DLDID and ordered list selection information, a two byte classification key (MS Key) is retrieved from the Key field 146 and stored in a specified output register. Similarly, if the comparison between the information in the second Binary Compare Register 100, which contains a MAC destination address, associated DLDID and ordered list selection information, with the Search Field 148 yields an exact match, the associated two byte key (MD Key) is retrieved from the Key Field 146 and stored in an a specified output register. For example, if the search resulted in a match with the second entry in the MDA ordered list, the key MD $Key_2$ would be retrieved from the respective Lookup table and if the search revealed a match with the third entry of the MSA ordered list, the key MS $Key_3$ would likewise be retrieved from the respective Lookup table.

It should further be appreciated that in certain circumstances, such as in cases in which all of the bits within the search field are not employed in the search, a match may be indicated where the search value is related to or associated with the value within the search field of the respective ordered. More particularly, if some of the bits within the search value constitute "don't care" conditions for the search, a match may be indicated if the comparison of the remaining bits of interest constitute a match.

To expedite the search process, the binary searches for the keys associated with MAC source and destination addresses are performed on an overlapping basis such that the two classification keys (MD Key and MS Key) are identified at substantially the same time. The two classification keys derived from the searches of the respective ordered lists thus produce two two-byte classification keys which serve to classify the respective source and destination addresses and associated data link domain identification information. The Binary Compare Engine state machine 94 next causes the first and second classification keys (MD Key and MS Key) derived from the search of MAC related ordered lists to be concatenated and stored temporarily within a register. In the above referenced example, MD $Key_2$ would be concatenated with MS $Key_3$ and thereafter stored temporarily in a register.

Following identification of the MAC compact keys, in a manner similar to that described above in connection with the MAC source and destination addresses, the parsed Network Layer source and destination addresses are loaded into the Binary Compare Registers and first and second Network Layer classification keys (ND Key and NS Key) are identified in the event that matches are located within appropriate ordered lists of the lookup tables 130. These keys are also concatenated, stored in one of the Binary Compare Registers and employed as the basis for a further binary search of the appropriate ordered list within the lookup tables 130 on an overlapping basis to provide the search output results substantially simultaneously. In the above referenced example, if a search of the Search Field 148 yielded a match with the $NDA_1$ entry and a search of the Search Field 148 yielded a match with the $NSA_2$ entry, the ND $Key_1$ and NS $Key_2$ entries would be retrieved, concatenated and stored temporarily in a register.

If one or both of the binary comparisons of the respective registers 98 and 100 with the respective search fields of the lookup tables do not produce match, the frame is passed to a microprocessor through the host interface 19 for special handling.

Following the identification of the compact classification keys for the MAC addresses (MD Key and MS Key) and the Network Layer addresses (ND Key and NS Key), the concatenation of such compact classification keys and the loading of such keys into respective first and second Binary Compare Registers, the Binary Compare Engine cause further binary searches of the lookup tables 130 to ascertain whether there is an exact match for the two concatenated key pairs within the respective ordered lists of the lookup tables 130. If exact matches are identified via the comparators 104 or 106 between the concatenated keys stored in the respective Binary Compare Registers and entries within the respective ordered lists, the associated keys are retrieved by the Parsing Engine and caused to be stored in the Output Data Buffer 114. In the above referenced example, the search of the search field 148 for the concatenated entry MD $Key_2$-MS $Key_3$ would yield a match with the second entry in the fifth ordered list. The associated classification key ($Midget_2$) would then be retrieved and stored in the Output Data Buffer 114 for insertion into the initial framelet of the frame in a manner hereinafter discussed. Additionally, the search of the Search Field for the concatenated entry ND $Key_1$-NS $Key_2$ would yield a match with the entry in the sixth ordered list. The associated classification key ($Nidget_1$) which then be retrieved and stored in the Output Data Buffer 114 for insertion into the initial framelet of the frame.

Following the generation of the two two-byte compact keys (namely, the Midget and the Nidget) in the above described manner, the header framelet is further modified to insert into the initial framelet the classification key information obtained via the binary searches of the lookup tables. More specifically, referring to FIG. 9b, prior to transmission of the initial framelet of a frame out of the Mapper Engine state machine 18 to the Search Engine state machine 22 via the bus 36 (see FIG. 1), the Mapper Engine state machine 18 causes the Network Layer classification key referred to as the Nidget to be inserted into the initial framelet of the frame after the SOT field and causes the MAC layer address classification Key referred to as the Midget to be inserted into the framelet after the Nidget. Additionally, following the Midget, a MAC descriptor field is inserted into the framelet. The MAC descriptor field contains two information fields; namely, the MAC destination indicator and the MAC source address classification key. The MAC destination indicator identifies the frame as either a unicast or a multicast frame. Such information is employed within the frame processor for source aging. The initial framelet of the frame, as thus modified and as illustrated in FIG. 9b, is transmitted out of the Mapper Engine 18 for processing by the Search Engine 22.

The Mapper Engine state machine further provides for same port bridge filtering in the following manner. If the Parsing Engine state machine determines that both the source and destination MAC addresses are valid within the Pattern Memory 102 and both the source and destination addresses reside on the same segment, the frame qualifies for discard. In such event, the Mapping Engine ascribes specific Nidget and Midget classification keys which indicate to the Search Engine that the frame is to be discarded. The Nidget includes an identification of the involved input port to insure proper statistics updating. The MAC source key is transmitted to insure proper source aging in the Statistics Engine state machine and the MAC Protocol Data Unit (PDU) is discarded by the Mapper Engine state machine 18. The Start of Frame framelet is truncated following transmission of the MAC Source Key. Further, the Mapper Engine records the state of the segment as qualifying for Source Port Bridge Filtering and discards any further information from the respective segment until an End of Frame condition is detected. If the source or destination MAC address are not mapped in the Pattern Memory, the frame will be processed as an unrecognized frame.

Use of Mapper Engine Generated Keys

The Search Engine 22, within the frame processor 10 continues and completes the process of frame recognition and classification based upon the compact classification keys embedded within the initial framelet of the received frame.

The framelet format for framelets received and transmitted by the Search Engine state machine are illustrated in FIGS. 10a and 10b. Based upon the Network Address classification key (Nidget) and the MAC address classification key (Midget), the Search Engine state machine performs byte serial testing of the frame header against string values known for the specified frame addresses. In this manner both discrimination of the frame's vector and validation of the protocol requirements are completed.

The Search Engine state machine validates the header data and completes the frame recognition process. More specifically, the Search Engine accesses a search table to associate a Vector ID with the received Nidget and Midget. Following identification of the Vector ID, the Search Engine inserts the Vector ID (VID) into the initial framelet in a field after the SOT field and before the Nidget, as depicted in FIG. 10b. The Vector ID is used as a pointer to particular microcode and/or software for subsequent processing of the frame in the respective frame processor engines. Basing the search table on compact (two byte) classification keys rather than full width addresses allows the keys to be sequentially assigned via software administration routines and permits the search table within the Search Engine state machine 22 to have a much higher density of known values than would be achieved if the addresses themselves were used for indexing or searching.

The Modification Engine state machine 24 uses the Vector ID embedded within the initial framelet of frames received from the Search Engine state machine to select a particular processing routine to be employed within the engine. One such application in the Modification Engine involves "swizzling", the process of reformatting addresses within frames received in one protocol to comply with the address format of another protocol. In particular, MAC layer addresses as defined in the IEEE 802.3 and 802.4 specifications are defined as six octets wherein the least significant bit stored in memory is transmitted first and the most significant bit is transmitted last. In the IEEE 802.5 and FDDI protocols, the most significant bit is transmitted first and the least significant bit is transmitted last. Thus, in translating frames received in the 802.3 frame format for transmission in compliance with the 802.5 frame format, the MAC address bits must be reversed prior to transmission. In the present example, the Vector ID conveyed from the Search Engine to the Modification Engine may be used to select a particular software control routine for swizzling and/or translation from one protocol as well as other frame modifications that must be made prior to transmission of the frame. The output of the Modification Engine state machine 24 is forwarded to the Buffer Manager state machine 32 through multiplexer 28 via bus paths 46 and 48.

As discussed above the Modification Engine state machine 22 is also coupled to the Statistics Engine 24 through bus 42. The Statistics Engine state machine 24 records frame and byte statistics for the respective protocols, records interface frame and byte statistics and performs MAC source address timestamp updating for source address aging.

The Buffer Manager transmits received frames to the Fragmentation Engine state machine 30 over bus 50. The Fragmentation Engine state machine applies protocol specific routines in order to segment oversized frames. More specifically, the frame's length, as supplied by the Buffer Manager state machine is tested against a maximum permitted length for the respective protocol for the respective input/output port 16. Frames which do not require segmentation are retransmitted by the Fragmentation Engine state machine 30 to the LAI 14 unchanged over bus 52 for transmittal over one of the ports 16 to the connected network.

Alternatively, with respect to a frame directed for transmission over the ATM link 56, the Buffer Manager state machine 32 transmits the frame to the Segmentation and Reassembly state machine 34 for proper segmentation in accordance with the ATM protocol requirements prior to transmission of the frame.

Figure 11:
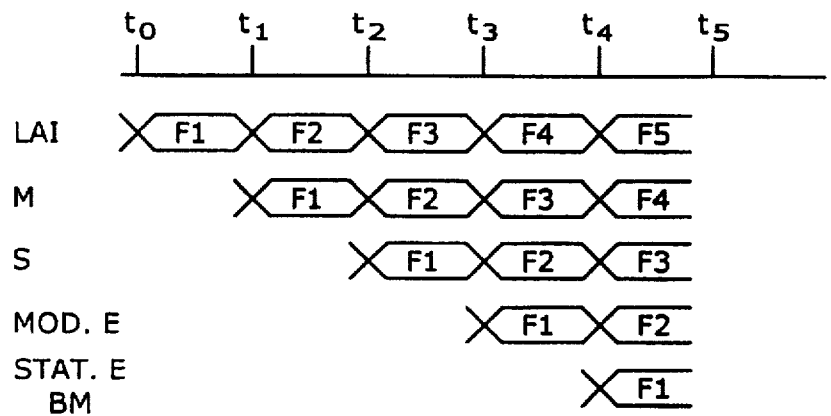
FIG. 11 is a timing diagram illustrating the pipelining of frames through the respective state machines of the frame processor of FIG. 1.

Frame processing, as depicted in FIG. 11 is handled on a pipelined basis. More specifically, each state machine sequentially processes received frames at the frame reception rate, which, in the present embodiment is approximately 4 microseconds. Thus, as apparent from FIG. 11 frames may be processed at a rate which avoids overrun conditions and the necessity to discard frames.

Figure 12:
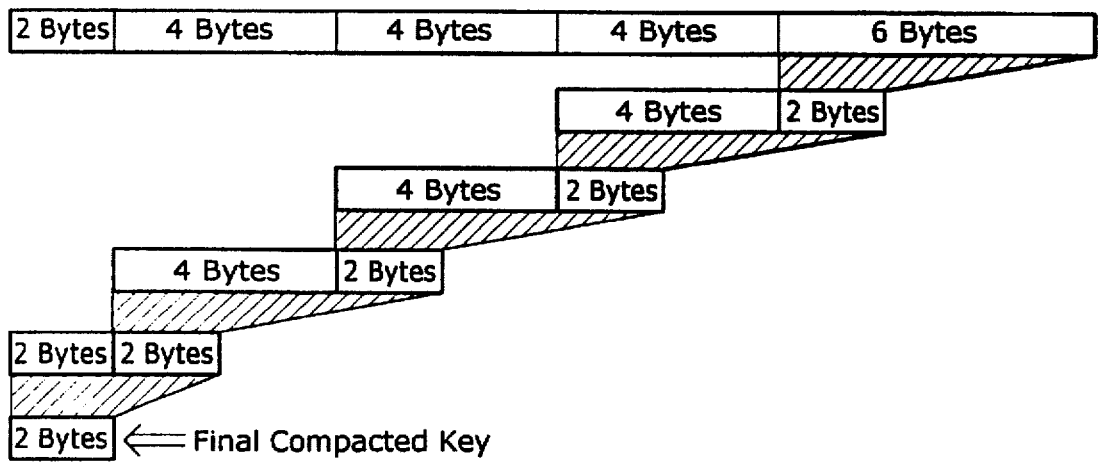
FIG. 12 is a diagram illustrating a five level compaction process in accordance with the present classification method.

Finally, it should be appreciated that the compaction technique described above may be extended through multiple levels of compaction. More specifically, some network protocols, such as ISO CLNP, have addresses which exceed six bytes in length. The ISO, CLNP protocol, for example, has a 20 byte address. Since the first field of the lookup tables is only six bytes wide in the present embodiment, the classification key for an address which exceeds the allotted address width within the search field is generated through a iterative process. As illustrated in FIG. 12, a search is performed on 6 bytes of the ISO address to generate a 2 byte key which is then concatenated with another 4 bytes of the ISO address to form another 6 byte value. This process is repeated sequentially to resolve the 20 byte ISO address into a 2 byte classification key. Moreover, ISO addresses may be compacted to generate a 2 byte classification key in only 4 compaction steps since the most significant three bytes specify the address format. Thus, to avoid the fifth compaction step, such values would need to be parsed prior to the compaction operation. It should be appreciated that in the above described manner, data of any width may be classified using the above described process, even in circumstances where the width of the data field being classified exceeds the width of the associated data field within the search fields of the respective lookup tables.

It should further be appreciated that the above described method and apparatus may be employed to classify any data having a predefined data format such that relevant portions of the data may be parsed from the data.

The above described methods and apparatus are illustrative of a novel frame processor which provides for rapid frame recognition, classification and processing while minimizing the likelihood of frame loss. Other modifications, embodiments and departures from the present disclosure will be apparent to those skilled in the art without departing from the inventive concepts contained herein. Accordingly, the invention is to be viewed as embracing each and every novel feature and novel combination of features present in or possessed by the techniques and apparatus herein disclosed and is to be viewed as limited solely by the scope and spirit of the appended claims.

What is claimed is:

1. A method for classifying received data having at least one predetermined format and containing a plurality of data values within said received data comprising the steps of:

in a first parsing step, parsing said received data to retrieve at least first and second data values of said plurality of data values;

in a first searching step, searching a first field of a first lookup table having said first field and a second associated field to locate an entry having a value associated with said first data value, and identifying a first classification value in the respective second associated field of said first lookup table;

in a second searching step, searching a first field of a second lookup table having said first field and a second associated field to locate an entry having a value associated with said second data value, and identifying a second classification value in the respective second associated field of said second lookup table;

concatenating said first and second classification values to generate a third data value;

in a third searching step, searching a first field of a third lookup table to locate an entry having a value associated with said third data value, and identifying a third classification value in the respective second associated field of said third lookup table; and selecting at least one processing step to be performed upon said received data based upon the value of said third classification value.

2. The method of claim 1 wherein said first, second and third searching steps comprise the steps of performing first, second and third searches of respective first fields of said first, second and third lookup tables to locate first, second and third entries within the respective first fields having values which are equal to said first, second and third data values respectively.

3. The method of claim 2 wherein said first, second and third searching steps comprise the steps of performing first, second and third binary searches of the first fields of respective first, second and third lookup tables to locate first, second and third entries having values within said fields which are equal to said first, second and third data values respectively.

4. The method of claim 1 wherein said first and second searching steps are performed concurrently.

5. The method of claim 1 wherein said selecting step comprises the steps of:

associating said third classification key with said received data;

transmitting said received data and said third classification value to at least one first data processor for processing of said received data; and identifying a routine for processing said received data based upon the value of said third classification value; and processing said received data within said first data processor in accordance with the routine identified in said identifying step.

6. The method of claim 5 wherein said associating step comprises the step of encapsulating said third classification value within said received data prior to said transmitting step.

7. The method of claim 1 wherein said first, second and third lookup tables comprise first, second and third ordered lists within a single table.

8. The method of claim 7 wherein said first, second and third ordered lists are stored within a single memory array.

9. The method of claim 7 wherein each of said searching steps includes the steps of:

specifying one of said ordered lists based upon a selection field which specifies the ordered list to be searched;

searching the first field of the ordered list specified in the specifying step to locate an entry which contains a first data portion equal to the respective data value and a second data portion equal to a value which specifies an identification of a virtual local area network for the respective data value.

10. A method for classifying received data having at least one predetermined format and containing at least first, second, third and fourth data values within said received data, comprising the steps of:

in a first parsing step, parsing said received data to retrieve at least said first and second data values;

in a first searching step, searching a first field of a first lookup table having said first field and a second associated field to locate an entry having a value associated with said first data value, and identifying a first classification value in the respective second associated field of said first lookup table;

in a second searching step, searching a first field of a second lookup table having said first field and a second associated field to locate an entry having a value associated with said second data value, and identifying a second classification value in the respective second associated field of said second lookup table;

in a first concatenating step, concatenating said first and second classification values to generate a fifth data value;

in a third searching step, searching a first field of a third lookup table having said first field and a second associated field to locate an entry having a value associated with said fifth data value, and identifying a third classification value in the respective second associated field of said third lookup table;

in a second parsing step, retrieving from said received data at least said third and fourth data values;

in a fourth searching step, searching a first field of a fourth lookup table having said first field and a second associated field to locate an entry having a value associated with said third data value, and identifying a fourth classification value in the respective second associated field of said fourth lookup table;

in a fifth searching step, searching a first field of a fifth lookup table having said first field and a second associated field to locate an entry having a value associated with said fourth data value, and identifying a fifth classification value in the respective second associated field of said fifth lookup table;

in a second concatenating step, concatenating said fourth and fifth classification values to generate a sixth data value;

in a sixth searching step, searching a first field of a sixth lookup table having said first field and a second associated field to locate an entry having a value associated with said sixth data value, and identifying a sixth classification value in the respective second associated field of said sixth lookup table; and selecting at least one processing step to be performed upon said received data based upon at least one of said third and sixth classification values.

11. The method of claim 10 wherein said first, second, third, fourth, fifth and sixth searching steps comprise the steps of performing first, second, third, fourth, fifth and sixth searches of the first field of respective first, second, third, fourth, fifth and sixth lookup tables to locate entries having values which are equal to the respective first, second, fifth, third, fourth and sixth data values respectively and identifying in the respective second associated field of the respective lookup tables first, second, third, fourth, fifth and sixth classification values.

12. The method of claim 11 wherein said first, second, third, fourth, fifth and sixth searching steps include the steps of performing binary searches of the first field of the respective lookup tables to locate entries having values which are equal to the first, second, fifth, third, fourth and sixth data values respectively and identifying in the second associated field of the respective lookup tables first, second, third, fourth, fifth and sixth classification values.

13. The method of claim 10 wherein selecting step includes the steps of:

associating said third and sixth classification values with said received data;

transmitting said received data and said third and sixth classification values to at least one data processor for processing of said received data; and identifying a routine for processing said received data based upon the value of at least one of said third and sixth classification values; and processing said received data within said data processor in accordance with said routine identified in said identifying step.

14. The method of claim 13 wherein said associating step includes the step of encapsulating said third and said sixth classification values within said received data prior to said transmitting step.

15. The method of claim 10 wherein said first, second, third, fourth, fifth and sixth lookup tables comprise ordered lists within a single table.

16. The method of claim 15 wherein said first, second, third, fourth, fifth and sixth lookup tables are stored within a single memory array.

17. The method of claim 15 wherein each of said searching steps includes the steps of:

specifying one of said ordered lists based upon a selection field which specifies the ordered list to be searched;

searching the first field of the ordered list specified in the specifying step to locate an entry which contains a first data portion equal to the respective data value and a second data portion equal to a value which specifies an identification of a virtual local area network for the respective data value.

18. The method of claim 10 wherein said first and second searching steps are performed concurrently and said fourth and first searching steps are performed concurrently.

19. A method for classifying a frame received over a communication link, wherein said received frame contains a Media Access Control (MAC) destination address and a MAC source address, comprising the steps of:

in a parsing step, retrieving said MAC destination and source addresses from said frame;

in a first searching step, searching a first field of a first lookup table having said first field and a second associated field to locate an entry having a value associated with said MAC destination address, and identifying a first classification value in the respective second associated field of said first lookup table;

in a second searching step, searching a first field of a second lookup table having said first field and a second associated field to locate an entry having a value associated with said MAC source address, and identifying a second classification value in the respective second associated field of said second lookup table;

concatenating said first and second classification values to generate a concatenated search value;

in a third searching step, searching a first field of a third lookup table having said first field and a second associated field to locate an entry having a value associated with said concatenated search value, and identifying a third classification value in the respective second associated field of said third lookup table; and selecting at least one processing step to be performed upon said frame based upon the value of said third classification value.

20. The method of claim 19 wherein said first, second and third searching steps comprise the steps of performing first, second and third searches of said first field of the respective lookup table to locate first, second and third entries which are equal to said MAC destination address, said MAC source address and said concatenated search value respectively.

21. The method of claim 20 wherein said first, second and third searching steps comprise the steps of performing first, second and third binary searches of at least a portion of the first field of the respective lookup tables to locate first, second and third entries which are equal to said MAC destination address, MAC source address and concatenated search values respectively.

22. The method of claim 19 wherein said selecting step comprises the steps of:

associating said third classification key with said frame;

transmitting said received frame and said third classification value to at least one data processor for processing of said received frame; and identifying a routine for processing said received frame based upon said third classification value; and processing said frame within said first data processor in accordance with said routine identified in said identifying step.

23. The method of claim 22 wherein said associating step comprises the step of encapsulating said third classification value within said received frame prior to said transmitting step.

24. The method of claim 19 wherein said first, second and third lookup tables comprise first, second and third ordered lists within a single table.

25. The method of claim 24 wherein said first, second and third ordered lists are stored within a single memory array.

26. The method of claim 24 wherein each of said searching steps includes the steps of:

specifying one of said ordered lists based upon a selection field which specifies the ordered list to be searched;

searching the first field of the ordered list specified in the specifying step to locate an entry which contains a first data portion equal to the respective data value and a second data portion equal to a value which specifies an identification of a virtual local area network for the respective data value.

27. The method of claim 19 wherein said first and second searching steps include the step of performing said searches concurrently.

28. A method for classifying a frame over a communication link at a frame processor, wherein said frame includes a Media Access Control (MAC) destination address, a MAC source address, a Network Layer destination address and a Network Layer source address, comprising the steps of:

in a first parsing step, retrieving from said received data at least said MAC destination address and said MAC source address;

in a first searching step, searching a first field of a first lookup table having said first field and a second associated field to locate a first entry having a value associated with said MAC destination address and retrieving a first classification value from the respective second associated field of said first lookup table;

in a second searching step, searching a first field of a second lookup table having said first field and a second associated field to locate a second entry having a value associated with said MAC source address and retrieving a second classification value from the respective second associated field of said second lookup table;

in a first concatenating step, concatenating said first and second classification values to generate a first concatenated search value;

in a third searching step, searching a first field of a third lookup table having said first field and a second associated field to locate a third entry having a value associated with said first concatenated search value and retrieving a third classification value from the respective second associated field of said third lookup table;

in a second parsing step, retrieving from said received frame at least said Network Layer destination address and said Network Layer source address;

in a fourth searching step, searching a first field of a fourth lookup table having said first field and a second associated field to locate a fourth entry having a value associated with said Network layer destination address, and identifying a fourth classification value from the respective second associated field of said fourth lookup table;

in a fifth searching step, searching said a first field of a fifth lookup table having said first field and a second associated field to locate a fifth entry having a value associated with said Network Layer source address and retrieving a fifth classification value from the respective second associated field of said fifth lookup table;

in a second concatenating step, concatenating said fourth and fifth classification values to generate a second concatenated search value;

in a sixth searching step, searching a first field of a sixth lookup table having said first field and a second associated field to locate an entry having a value associated with said second concatenated search value and retrieving a sixth classification value from the respective second associated field of said sixth lookup table; and selecting at least one processing step to be performed upon said received frame based upon at least one of said third and sixth classification values.

29. The method of claim 28 wherein said first, second, third, fourth, fifth and sixth searching steps include the steps of: performing first, second, third, fourth, fifth and sixth searches of a portion of the first fields of said respective first, second, third, fourth and fifth and sixth lookup tables to locate first, second, third, fourth, fifth and sixth entries having values equal to said MAC destination address, MAC source address, first concatenated search value, Network Layer destination address, Network Layer source address respectively.

30. The method of claim 29 wherein said first, second, third, fourth, fifth and sixth searching steps include the steps of performing binary searches of a portion of the first field of each of the respective lookup tables to locate first, second, third, fourth and fifth entries having values equal to the MAC destination address, MAC source address, first concatenated search value, Network Layer destination address, Network Layer source address and the second concatenated search value and retrieving from the second associated field of the respective lookup tables first, second, third, fourth, fifth and sixth classification values respectively.

31. The method of claim 30 wherein said first and second searching steps are performed concurrently and said fourth and fifth searching steps are performed concurrently.

32. The method of claim 28 wherein selecting step includes the steps of:

associating said third and sixth classification values with said received frame;

transmitting said received frame and said third and sixth classification values to at least one data processor for processing of said received frame; and identifying a routine for processing said received frame based upon the value of at least one of said third and sixth classification values; and processing said received data within said data processor in accordance with the routine identified in said identifying step.

33. The method of claim 32 wherein said associating step includes the step of encapsulating said third and said sixth classification values within said received frame prior to said transmitting step.

34. The method of claim 28 wherein said first, second, third, fourth, fifth and sixth lookup tables comprise ordered lists within a single table.

35. The method of claim 34 wherein said first, second, third, fourth, fifth and sixth ordered lists are contained in a single memory array.

36. The method of claim 28 wherein each of said searching steps includes the steps of:

specifying one of said ordered lists based upon a selection field which specifies the ordered list to be searched;

searching the first field of the ordered list specified in the specifying step to locate an entry which contains a first data portion equal to the respective data value and a second data portion equal to a value which specifies an identification of a virtual local area network for the respective data value.

37. Apparatus for classifying frames received over a computer network comprising:

a first classification processor having an input bus interface for receiving a frame having a Media Access Control source address and a Media access control destination address and an output bus interface;

a second classification processor having an input bus interface and an output bus interface, said first classification processor output bus interface being coupled to said second classification processor input bus interface;

a pattern memory containing a plurality of lookup tables wherein each of said lookup tables includes a search field having a plurality of search field entry values and a key field having a like plurality of key field entry values, each of said key field entry values being associated with one of said search field entry values, said pattern memory in electrical communication with said first classification processor, said search field containing at least one first group of search field entry values corresponding to selected MAC source addresses, at least one second group of search field entry values corresponding to selected MAC destination addresses, and a third group of entry values, said key field containing a compact key value associated with each of said first, second and third groups of entry values;

said first classification processor being operative to receive a frame at the input bus interface, parse said frame to extract said source and destination addresses from said received frame, perform first and second searches of said first and second groups of entry values respectively within predetermined ones of said lookup tables to locate a first value in said first group of entry values which matches said parsed source address and a second value in said second group of entry values which matches said parsed destination address, retrieve respective first and second key values associated with said first and second values in said first and second groups which match said parsed source and destination addresses respectively, concatenate said first and second key values to form a concatenated key value, search said third group of entry values to locate a value corresponding to said concatenated key value, extract from said predetermined ones of said lookup tables an output key value associated with said value corresponding to said concatenated key value and forward said output key value from said first classification processor to said second classification processor in association with said received frame.

38. The apparatus of claim 37 wherein said second classification processor includes a memory containing a search table, said search table having a key field containing a plurality of key field entry values and a vector ID field containing a like plurality of vector ID entry values, each of said vector ID entry values being associated with a key field entry value in said search table, said second classification processor, upon receipt of said output key value from said first classification processor, being operative to search said key field within said search table to locate a value corresponding to said output key value and to retrieve a vector ID value from said vector ID field corresponding to said output key value;

said retrieved vector ID value being employed to select a processing routine to be employed in the processing of said received frame.

39. The apparatus of claim 38 further including a frame modification processor having an input bus interface, said second classification processor output bus interface coupled to said frame modification processor input bus interface, said second classification processor, being operative to forward said retrieved vector ID to said frame classification processor in association with said received frame; and said frame modification processor being operative to select said frame processing routine based upon the value of said vector ID.

40. The apparatus of claim 37 wherein said apparatus further includes first and second registers in electrical communication with said first classification processor, said classification processor being operative to store said parsed source address in said first register prior to said search of said first group of entry values and to store said parsed destination address in said second register in said second register prior to said search of said second group of entry values.

41. The apparatus of claim 37 wherein said first classification processor is operative to perform said first and second searches of said first and second groups of entry values substantially simultaneously.

42. The apparatus of claim 37 wherein said first and second searches performed by said first classification processor are binary searches and said first, second and third groups of entry values comprise first, second and third ordered lists of entry values respectively.

43. A method for classifying data comprising the steps of:

parsing said data to retrieve a first data portion;

dividing said first data portion into a first data segment and at least one additional data segment;

in a first searching step, searching a first field of a first lookup table constituting one of a plurality of lookup tables, each of said lookup tables having said first field and a second field, said search being performed to locate a value within said first field of said first lookup table which is associated with the value of said first data segment and retrieving from said second field of said first lookup table a first classification key; and in a concatenating step, for each of said additional at least one data segments concatenating the last retrieved classification key with another one of said at least one data segments to form a concatenated search value and searching another predetermined one of said plurality of lookup tables to locate a value within said first field which is associated with the respective concatenated search value and following each such search, retrieving a classification key from the corresponding second field of the respective lookup table to generate a final classification key.

44. The method of claim 43 further comprising the steps of:

parsing said data to retrieve a second data portion;

dividing said second data portion into a first data segment and at least one additional data segments;

repeating said first searching step and said concatenating step to generate a second final classification key.

45. The method of claim 44 further comprising the steps of:

concatenating said first final classification key and said second final classification key to produce a final search value;

searching the first field of another one of said plurality of lookup tables to locate a value which equals said final search value and retrieving from the respective second field of said lookup table an output classification key.

46. The method of claim 45 further comprising the step of performing further processing of said data based upon the value of said output classification key.

47. The method of claim 46 wherein said method further comprises the step or receiving a frame at in input port of a network switch prior to said parsing step, wherein said received frame constitutes said data.

48. A frame processor comprising:

first, second, third and fourth frame processing engines, each of said engines having an input port and an output port, the input port of each successive frame processing engine being electrically coupled to the input port of the preceding frame processing engine; said first frame processing engine operative to:

receive a frame of a predetermined type having a predetermined header format at said first frame processing engine input port;

encapsulate within said frame header information identifying said frame type; and said second frame processing engine operative to:

receive said frame including said encapsulated information identifying said frame type at said second frame processing engine input port from said first frame processing engine output port;

parse said frame header to retrieve a plurality of data values embedded therein; and generate at least one classification value from said plurality of data values for further processing of said frame;

encapsulate said at least one classification value within said frame header;

said third frame processing engine operative to:
- receive said frame including said encapsulated at least one classification value at said third frame processing engine input port from said second frame processing engine output port;
- identify a vector in response to said at least one classification value contained within said frame header; and
- encapsulate said vector within said frame header;

said fourth frame processing engine operative to:
- receive said frame including said encapsulated vector at said fourth frame processing engine input port from said third frame processing engine output port; and
- at least some of the time, said fourth frame processing engine modifies said frame in accordance with a routine specified by said vector;

a buffer memory having an input port operative to:
- receive said frame at said buffer memory input port from said fourth processing engine output port and to store said frame following receipt thereof;

wherein said first, second, third and fourth processing engines and said memory are pipelined and said first, second, third and fourth frame processing engines process said frame in sequence prior to storage of said frame in said buffer memory.

49. The frame processor of claim 48 wherein each of said frame processing engines is capable of processing a different frame concurrently.

50. A method of classifying a frame received at an input port of a network switch comprising the steps of:
- parsing said received frame to retrieve a plurality of data segments;
- in a first searching step, for each of said plurality of data segments, searching a first field of a predetermined one of a plurality of lookup tables having said first field and an associated second field to locate a value within said first field associated with the respective data segment and retrieving from the respective second field a classification key;
- concatenating said classification keys retrieved in said searching step to form a concatenated search value;
- in a second searching step, searching the first field of another predetermined one of said plurality of lookup tables having said first field and a second associated field to locate a value within said first field associated with said concatenated search value and retrieving the respective second field an output classification key; and
- performing further processing of said frame based, at least in part, upon the value of said output classification key.

* * * * *

UNITED STATES PATENT AND TRADEMARK OFFICE
CERTIFICATE OF CORRECTION

PATENT NO. : 5,748,905
DATED : May 5, 1998
INVENTOR(S) : Stephen A. Hauser, et al.

It is certified that error appears in the above-identified patent and that said Letters Patent is hereby corrected as shown below:

<u>Column 15,</u>
Line 22, "claim 13", should read -- claim 11 --.

Signed and Sealed this

Thirtieth Day of October, 2001

Attest:

*Attesting Officer*

NICHOLAS P. GODICI
*Acting Director of the United States Patent and Trademark Office*